United States Patent [19]

Ahlstrom et al.

[11] 4,455,604
[45] Jun. 19, 1984

[54] DIGITAL DATA PROCESSING SYSTEM HAVING ADDRESSING MEANS FOR TRANSLATING OPERANDS INTO DESCRIPTORS IDENTIFYING DATA, PLURAL MULTILEVEL MICROCODE CONTROL MEANS, AND ABILITY TO EXECUTE A PLURALITY OF INTERNAL LANGUAGE DIALECTS

[75] Inventors: John K. Ahlstrom, Mountain View, Calif.; Brett Bachman, Boston, Mass.; Richard A. Belgard, Saratoga, Calif.; David H. Bernstein, Ashland, Mass.; Richard G. Bratt, Wayland, Mass.; Ronald H. Gruner, Cary, N.C.; Thomas M. Jones, Chapel Hill, N.C.; Lawrence H. Katz, Oregon City, Oreg.; Craig J. Mundie, Cary, N.C.; Michael S. Richmond, Pittsboro, N.C.; Stephen I. Schleimer, Chapel Hill, N.C.; Steven J. Wallach, Saratoga, Calif.; Walter A. Wallach, Jr, Raleigh, N.C.; Douglas M. Well, Chapel Hill, N.C.

[73] Assignee: Data General Corporation, Westboro, Mass.

[21] Appl. No.: 266,422

[22] Filed: May 22, 1981

[51] Int. Cl.³ .................. G06F 7/00; G06F 9/10
[52] U.S. Cl. .................................................. 364/200
[58] Field of Search ... 364/200 MS File, 900 MS File

[56] References Cited

U.S. PATENT DOCUMENTS

| 3,976,978 | 8/1976 | Patterson et al. | 364/200 |
| 4,084,228 | 4/1978 | Dufond et al. | 364/200 |
| 4,218,743 | 8/1980 | Hoffman et al. | 364/200 |

*Primary Examiner*—Jerry Smith
*Assistant Examiner*—William G. Niessen
*Attorney, Agent, or Firm*—Joel Wall; Gene Nelson; Robert F. O'Connell

[57] ABSTRACT

The processor of the present invention executes procedures, which comprise S-language instructions and names. S-languages are of higher order than typical machine languages and can be tailored to user high-order languages. Each procedure includes a dialect code which the processor interprets, enabling it to execute any of a plurality of dialects of S-languages. The processor includes means for resolving names into oper- and logical addresses. The processor possosses multiple levels of microcode control means, each with its own set of stacks.

32 Claims, 1 Drawing Figure

DIGITAL DATA PROCESSING SYSTEM HAVING ADDRESSING MEANS FOR TRANSLATING OPERANDS INTO DESCRIPTORS IDENTIFYING DATA, PLURAL MULTILEVEL MICROCODE CONTROL MEANS, AND ABILITY TO EXECUTE A PLURALITY OF INTERNAL LANGUAGE DIALECTS

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly affected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to digital computer systems employing object-based addressing of data. The digital computer system of the present invention includes a memory system including mass storage devices and one or more processors connected to the memory system.

The memory system is organized into objects containing data items. Each object is identified by an object identifier. Locations of data items in the memory system are specified by means of the object identifier for the object containing the data item and an offset specifying the bit at which the data item begins within the object.

The data items include procedures, which contain instructions which are executable by the processor. In the instructions, operands are represented by names. Each name in a procedure corresponds to a name table entry. Data in the name table entry corresponding to a name specifies how the processor is to derive the logical address of the operand represented by the name.

The processor does not possess a fixed machine language as do processors of the prior art, but can execute any of a plurality of S-languages. S-languages are of higher order than typical machine languages, and can be tailored to the characteristics and processing requirements of user HOL's (high-order languages). The instructions in a procedure are S-language instructions; the procedure also includes a dialect code which indicates the dialect to which the instructions of the present procedure belong. For purposes of executing the instructions, dispatching to appropriate microcode is controlled not only by the instruction bit pattern, but the current dialect code as well.

The processor possesses a plurality of levels of microcode means:
- the first level is invoked by the current S-language instruction in conjunction with the current contents of the dialect register, and provides the processor with the microcode control required to commence execution of that instruction of that dialect.
- the second level is invoked by operation of the processor hardware, and provides the processor with the microcode control it requires to carry out certain internal functions
- the monitor microcode level is also invoked by operation of the processor hardware and performs monitor functions required for control and coordination of the processor resources.

Each level of microcode has its own set of stacks and cashes.

It is thus an object of the present invention to provide an improved data processing system.

It is yet another object of the present invention to provide an improved addressing mechanism suitable for use in large, interconnected data processing networks.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanisms protected from user interference.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

BRIEF DESCRIPTION OF DRAWINGS

The figure numbers in this application have two components, one indicating the chapter in which the figure is located and the other the sequential number of the figure within that chapter. Thus, FIGS. 1 through 20 refer to the Introduction, 101 to 110 to Chapter 1, and so forth. There are no FIGS. 21-100, 111-200, 275-300, or 308-400 in the application.

Figure 1:
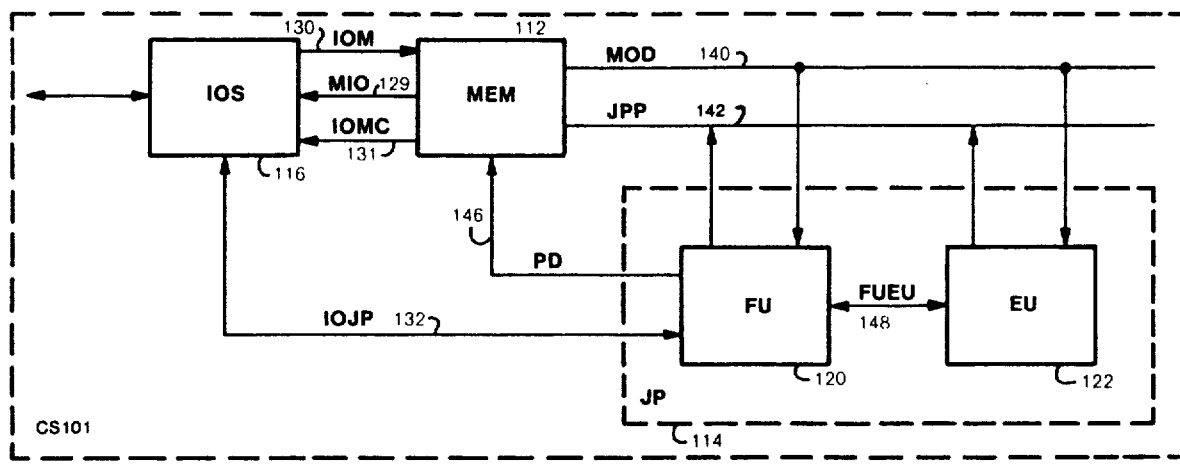
FIG. 1 is a partial block diagram of a computer system incorporating the present invention.
Figure 2:
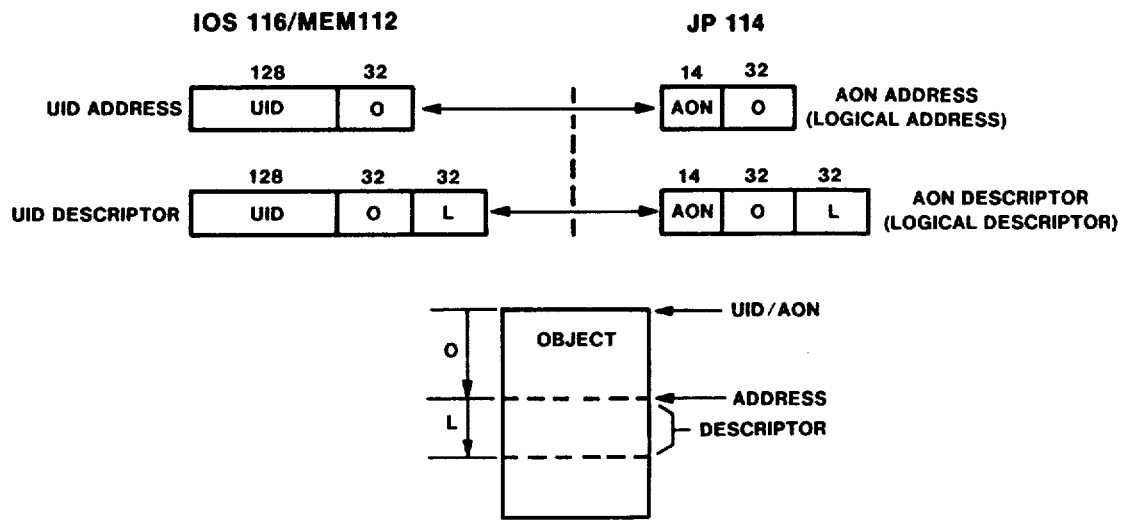
Figure 3:
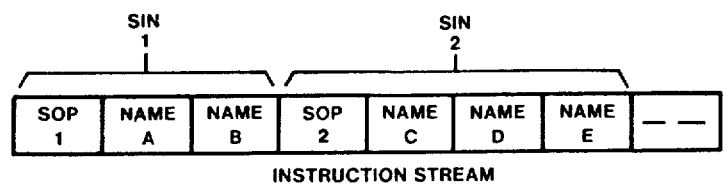

This application incorporates by reference the entire application, Ser. No. 266,402, filed on May 22, 1981, of Ward Baxter II et al.

More particularly, attention is directed to FIGS. 106A, 106B, 106C, 107, 203, and 249 of the drawings in application Ser. No. 266,402, and to that part of the specification, particularly at pages 110-114, 138-147, 512-516, and 648-682 thereof, which relate to subject matter of the claims herein.

What is claimed is:

1. In a digital computer system including processor means for performing operations on operands, memory means for storing said operands and procedures, said procedures including instructions for controlling said operations and names referring to said operands, bus means for conducting at least said instructions between said memory means and said processor means, and I/O means for conducting at least said operands between devices external to said digital computer system and said processor means, said processor means comprising:
   first microcode means responsive to said instructions and connected from said bus means comprising means for storing first sequences of microinstructions and means employing said first sequences of microinstructions for controlling at least said operations of said processor means as directed by said instructions, at least one sequence of microinstructions of said first sequences of microinstructions corresponding to each one of said instructions and said instructions being S-language instructions having a uniform, fixed format, and
   second microcode means responsive to the operation of said processor means and connected from said bus means comprising means for storing second sequences of microinstructions and means employing said second sequences of microinstructions for controlling internal operations of at least said processor means, and
   means responsive to said procedures for addressing said operands, including:
      name table means for storing name table entries, each one of said name table entries corresponding to one of said names associated with one of said instructions included in one of said procedures and said each one of said name table entries comprising (1) first data resolvable to provide a location in said memory means of one of said operands referred to by said corresponding one of said names, and, (2) second data identifying the format of said operand referred to by said corresponding one of said names, means connected from said bus means and responsive to said names for reading said name table entries corresponding to said names from said name table means, and means connected from said reading means for resolving each one of said name table entries for providing outputs to said memory means representing said locations in said memory means of said operands referred to by said names read from said memory means.

2. The digital computer system of claim 1, wherein said processor means further comprises:

monitor microcode means responsive to said processor means comprising means for storing sequences of monitor microinstructions and means employing said sequences of monitor microinstructions for controlling monitor operations of at least said processor means.

3. The digital computer system of claim 1, wherein:

said instructions are S-Language instructions written in an S-Language dialect of a plurality of S-Language dialects, and said first sequences of microinstructions include at least one sequence of microinstructions corresponding to each of said instructions for each S-Language dialect of said plurality of S-Language dialects.

4. The digital computer system of claim 1, wherein said processor means further comprises:

processor microinstructions stack means connected to said processor means and responsive to at least operation of said processor means for storing at least one microinstruction stack frame for storing a state of execution of a microinstruction of said first or second sequences of microinstructions.

5. The digital computer of claim 4, wherein said memory means further comprises:

memory microinstruction stack means for storing a plurality of microinstruction stack frames, each one of said plurality of said microinstruction stack frames for storing a state of execution of a microinstruction of said first or second sequences of microinstructions, and said processor microinstruction stack means further comprises microinstruction stack control means responsive at least said operation of said processor means for providing stack control signals to said processor microinstructions stack means and to said memory microinstruction stack means for controlling transfer of said microinstruction stack frames between said processor microinstruction stack means and said memory microinstruction stack means.

6. The digital computer system of claim 1, wherein each of said names is of uniform format.

7. The digital computer system of claim 1, wherein:

each said procedure further includes a name table pointer representing a base location in said memory means, and said first data of said each one of said name table entries of said procedure is resolvable to provide a said location in said memory means relative to said name table pointer of one of said operands referred to by one of said corresponding one of said names of procedure, and said resolving means further comprises base register means connected from said bus means and having outputs to said resolving means for storing said name table pointer of one of said procedure presently controlling said operations performed by said processor means.

8. The digital computer system of claim 8, wherein said processor means further comprises:

name cache means connected from outputs of said resolving means and having outputs to said memory means for storing said resolving means outputs representing said locations in said memory means of said operands, said name cache means connected from said reading means and responsive to said names to provide name cache outputs to said memory means representing said locations in said memory means of certain said operands for which said name cache means has stored said resolving means outputs.

9. The digital computer system of claims 1 or 2 or 3, wherein said processor means further comprises:

arithmetic means connected from said bus means for performing arithmetic operations on said operands, and arithmetic microcode means responsive to the operation of said processor means comprising means for storing sequences of arithmetic microinstructions and means employing said sequences of arithmetic instructions for controlling at least operation of said arithmetic means.

10. The digital computer system of claim 9, wherein said processor means further comprises:

processor arithmetic stack means connected from said arithmetic means and responsive to operation of at least said arithmetic means for storing at least one arithmetic stack frame for storing state of execution of an arithmetic microinstruction.

11. The digital computer system of claim 10, wherein said memory means further comprises:

memory arithmetic stack means for storing a plurality of arithmetic stack frames, each one of said plurality of microinstruction stack frames for storing a state of execution of a said arithmetic microinstruction, and said processor arithmetic stack means further comprises arithmetic stack control means responsive to at least said operation of said arithmetic means for providing control signals to said processor arithmetic stack means and to said memory arithmetic stack means for controlling transfer of said arithmetic stack frames between said processor arithmetic stack means and said memory arithmetic stack means.

12. The digital computer system of claim 9, wherein said memory means further comprises:

instruction stack means responsive to operation of at least said processor means for storing at least one instruction stack frame for storing a state of execution of an instruction.

13. The digital computer system of claim 1, wherein each one of said S-Language instructions is written in an S-Language dialect of a plurality of S-Language dialects, and wherein said processor means includes receiving means for receiving a current one of said s-language instructions, said receiving means further comprises dialect code means for storing a dialect code of a plurality of dialect codes, each said dialect code of said plurality of dialect codes corresponding to an S-Language dialect of said plurality of S-Language dialects, and a present said dialect code of said plurality of dialect codes representing which S-Language dialect of said plurality of S-Language dialects a present S-Language instruction is written in, said sequences of microinstructions include a set of sequences of microinstructions corresponding to each said S-Language dialect of said plurality of S-Language dialects, each set of sequences of microinstructions including at least one sequence of microinstructions corresponding to each said S-Language instruction in a said corresponding S-Language dialect, and said microcode control means is responsive to each said present dialect code and to each said present S-Language instruction to provide to said processor means said at least one sequence of microinstructions corresponding to said each said present S-Language instruction.

14. The digital computer system of claim 13, wherein said microcode control means further comprises:

control store means for storing said sequences of microinstructions for controlling said ALU means, and dispatch table means for storing addresses corresponding to locations in said control store means of each sequence of microinstructions of each said set of microinstruction sequences, said dispatch table means responsive to said each said present dialect code and to said each said present instruction to provide to said control store means each said address corresponding to said at least one microinstruction sequence corresponding to said each said present S-Language instructions, and said control store means responsive to said each said address to provide to said processor means said at least one microinstruction sequence corresponding to said each said present S-Language instruction.

15. The digital computer system of claim 14, wherein said control store means further comprises:

writable control store means connected from said bus means for storing said sequences of microinstructions, and said dispatch table means further comprising write address means responsive to operation of said processor means for generating write addresses, said writable control store means responsive to said write addresses for storing said sequences of microinstructions.

16. The digital computer system of claims 1 or 13 or 14, wherein said receiving means further comprises:

instruction register means connected from said bus means for storing at least one said S-Language instruction, and parsing means connected from said instruction register means for detecting said S-Language instructions stored in said instruction register means and for providing said S-Language instructions to said microcode control means.

17. The digital computer system of claims 1 or 13, wherein said microcode control means further comprises:

writable control store means connected from said bus means for storing said sequences of microinstructions, and control store addressing means responsive to said each of said S-Language instructions and to operation of said processor means for generating corresponding control store read and write addresses, said writable control store means responsive to each of said corresponding read addresses to provide said corresponding at least one sequence of microinstructions to said processor means, and responsive to said write addresses to store said sequences of microinstructions.

18. In a digital computer system including processor means for performing operations on operands, memory means for storing said operands and procedures, said procedures including instructions for controlling said operations and names referring to said operands, bus means for conducting at least said instructions between said memory means and said processor means, and I/O means for conducting at least said operands between devices external to said digital computer system and said processor means, said processor means comprising:

first microcode means responsive to said instructions and connected from said bus means comprising means for storing first sequences of microinstructions and means employing said first sequences of microinstructions for controlling at least said operations of said processor means as directed by said instructions, at least one sequence of microinstructions of said first sequences of microinstructions corresponding to each one of said instructions and said instructions being S-language instructions having a uniform, fixed format, and monitor microcode means responsive to operation of said processor and including means for storing sequences of monitor microinstructions and means employing said sequences of monitor microinstructions for controlling monitor system operations of at least said processor means, and means for addressing said operands, including:

name table means for storing name table entries, each one of said name table entries corresponding to one of said names associated with one of said instructions included in one of said procedures and said each one of said name table entries comprising (1) first data resolvable to provide a location in said memory means of one of said operands referred to by said corresponding one of said names, and, (2) second data identifying the format of said operand referred to by said corresponding one of said names, means connected from said bus means and responsive to said names for reading said name table entries corresponding to said names from said name table means, and means connected from said reading means for resolving each one of said name table entries for providing outputs to said memory means representing said locations in said memory means of said operands referred to by said names read from said memory means.

19. The digital computer system of claims 2 or 18, wherein said processor means further comprises:

monitor stack means connected to an ALU means and responsive to said operation of at least said ALU means for storing at least one monitor stack frame for storing state of execution of a monitor microinstruction.

20. The digital computer system of claims 1 or 2 or 18 or 3, wherein said memory means further comprises:
instruction stack means responsive to operation of at least said processor means for storing at least one instruction stack frame for storing a state of execution of an instruction.

21. In a digital computer system including processor means for performing operations on operands and memory means for storing said operands and procedures, said procedures including instructions for controlling said operations and names referring to said operands, said processor means comprising:
ALU means connected from said bus means for performing at least said operations directed by said instructions,
first microcode means responsive to said instructions and comprising means for storing first sequences of microinstructions and means employing said first sequences of microinstructions for controlling at least said operations of said processor means as directed by said instructions, said instructions being S-language instructions having a uniform, fixed format, and
second microcode means responsive to the operation of said processor means and comprising means for storing second sequences of microinstructions and means employing said second sequences of microinstructions for controlling internal operations of at least said processor means, and
means responsive to said procedures for addressing said operands, comprising:
name table means for storing name table entries, each one of said name table entries corresponding to one of said names associated with one of said instructions included in one of said procedures and said each one of said name table entries comprising data resolvable to provide a location in said memory means of one of said operands referred to by said corresponding one of said names, and
means responsive to said names for resolving said each one of said name table entries so as to provide outputs to said memory means representing said locations in said memory means of said operands.

22. The digital computer system of claim 21, wherein said processor means further comprises:
monitor microcode means responsive to said processor means comprising means for storing sequences of monitor microinstructions and means employing said sequences of monitor microinstructions for controlling monitor operations of at least said processor means, 23. The digital computer system of claim 22, wherein: said instructions are S-Language instructions written in an S-Language dialect of a plurality of S-Language dialects, and
said first sequences of microinstructions include at least one sequence of microinstructions corresponding to each of said instructions for each S-Language dialect of said plurality of S-Language dialects.

24. The digital computer system of claim 21, wherein said processor means further comprises:
processor microinstructions stack means responsive to at least operation of said processor means for storing at least one microinstruction stack frame for storing a state of execution of a microinstruction of said first or second sequences of microinstructions.

25. The digital computer of claim 24, wherein said memory means further comprises:
memory microinstruction stack means for storing a plurality of microinstruction stack frames, each one of said plurality of said microinstruction stack frames for storing state of execution of a microinstruction of said first or second sequences of microinstructions, and
said processor microinstruction stack means further comprises
microinstruction stack control means responsive to at least said operation of said processor means for providing stack control signals to said processor microinstructions stack means and to said memory microinstruction stack means for controlling transfer of said microinstruction stack frames between said processor microinstruction stack means and said memory microinstruction stack means.

26. The digital computer system of claim 21, wherein said processor means further comprises:
processor arithmetic stack means responsive to operation of at least said ALU means for storing at least one arithmetic stack frame for storing state of execution of an arithmetic microinstruction.

27. The digital computer system of claim 26, wherein said memory means further comprises:
memory arithmetic stack means for storing a plurality of arithmetic stack frames, each one of said plurality of microinstruction stack frames for storing a state of execution of a said arithmetic microinstruction, and
said processor arithmetic stack means further comprises
arithmetic stack control means responsive to at least said operation of said ALU means for providing control signals to said processor arithmetic stack means and to said memory arithmetic stack means for controlling transfer of said arithmetic stack frames between said processor arithmetic stack means and said memory arithmetic stack means.

28. The digital computer system of claims 21 or 22 or 23, wherein said processor means further comprises:
arithmetic means for performing arithmetic operations on operands, and
arithmetic microcode means responsive to operation of said processor means comprising means for storing sequences of arithmetic microinstructions and means employing said sequences of arithmetic microinstructions for controlling operation of said arithmetic means, 29. The digital computer system of claim 28, wherein said memory means further comprises:
instruction stack means responsive to operation of at least said processor means for storing at least one instruction stack frame for storing state of execution of an instruction.

30. In a digital computer system including processor means for performing operations on operands and memory means for storing said operands and procedures, said procedures including instructions for controlling said operations and names referring to said operands, said processor means comprising:

first microcode means responsive to said instructions and connected from said bus means comprising means for storing first sequences of microinstructions and means employing said first sequences of microinstructions for controlling at least said operations of said processor means as directed by said instructions, said instructions being S-language instructions having a uniform, fixed format, and monitor microcode means responsive to operation of said processor and including means for storing sequences of monitor microinstructions and means employing said sequences of monitor microinstructions for controlling monitor system operations of at least said processor means, and means for addressing said operands, including:
 name table means for storing name table entries, each one of said name table entries corresponding to one of said names associated with one of said instructions included in one of said procedures and said each one of said name table entries comprising data resolvable to provide a location in said memory means of one of said operands referred to by said corresponding one of said names, and means responsive to said names for resolving said each one of said name table entries so as to provide outputs to said memory means representing said locations in said memory means of said operands.

31. The digital computer system of claims 22 or 30, wherein said processor means further comprises:
 monitor stack means responsive to said operation of at least said processor means for storing at least one monitor stack frame for storing state of execution of a monitor microinstruction.

32. The digital computer system of claim 21 or 22 or 30 or 23, wherein said memory means further comprises:
 instruction stack means responsive to operation of at least said processor means for storing at least one instruction stack frame for storing state of execution of an instruction.

* * * * *